United States Patent [19]
Dalske et al.

[11] Patent Number: 5,314,094
[45] Date of Patent: May 24, 1994

[54] CLOTH FLUIDIZING MEMBRANE FOR HOPPER CAR OUTLET

[75] Inventors: Roger A. Dalske, Florissant; Dennis J. Schipper; David M. Maechling, both of St. Charles, all of Mo.

[73] Assignee: ACF Industries, Incorporated, Earth City, Mo.

[21] Appl. No.: 55,685

[22] Filed: Apr. 29, 1993

[51] Int. Cl.⁵ .............................. B65G 69/06
[52] U.S. Cl. ..................... 222/195; 222/630; 406/91
[58] Field of Search ............ 222/195, 630; 406/91, 406/138

[56] References Cited

U.S. PATENT DOCUMENTS

| | | | |
|---|---|---|---|
| 3,403,943 | 10/1968 | Stine et al. | 406/91 |
| 3,708,209 | 1/1973 | Dugge | 406/91 |
| 3,874,569 | 4/1975 | Fossett et al. | 406/91 X |
| 4,280,706 | 7/1981 | Vorwerk | 222/195 X |
| 4,413,758 | 11/1983 | Walters | 222/195 |
| 4,428,585 | 1/1984 | Dugge | 222/195 X |
| 4,439,072 | 3/1984 | Goedken | 406/91 |
| 4,846,377 | 7/1989 | Fix et al. | 222/630 X |
| 4,848,975 | 7/1989 | Alack | 406/138 |
| 5,096,096 | 3/1992 | Calavnan | 222/195 X |

*Primary Examiner*—Kevin P. Shaver
*Attorney, Agent, or Firm*—Polster, Lieder Woodruff & Lucchesi

[57] ABSTRACT

A limp, porous membrane (18) is formed from a flexible sheet material (20). The membrane is used with a fluidized hopper outlet (10) containing a pulverant, particulate lading which is fluidized and unloaded via the outlet. A valve installed in the outlet, when open, extends substantially through the outlet and allows fluidized lading to be unloaded through the outlet. The outlet has a frame (12) for securing the outlet to the hopper, an outlet opening (14) in which the valve is positioned, and intersecting outlet walls (16) extending between the frame and the opening. An outer margin (54) of the membrane is secured to the frame. An inner margin (18) of the membrane, which defines an opening for the lading, is attached to a boot (36). The boot is secured to the top of an outlet pan (P), adjacent the outlet opening, by a retainer ring (50). The ring locks the boot in place so the opening in membrane is secured adjacent to the outlet opening for the lading to flow into the outlet through the valve.

15 Claims, 2 Drawing Sheets

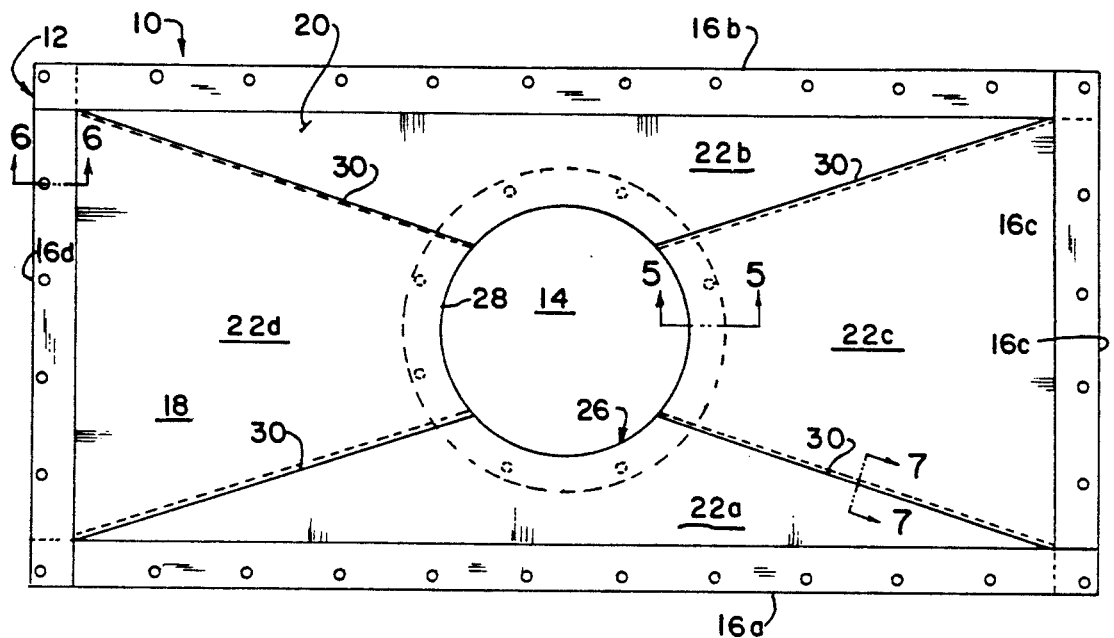
FIG.1.
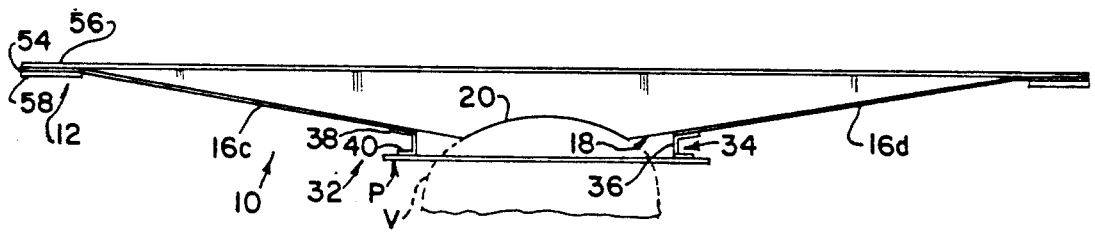
FIG.2.
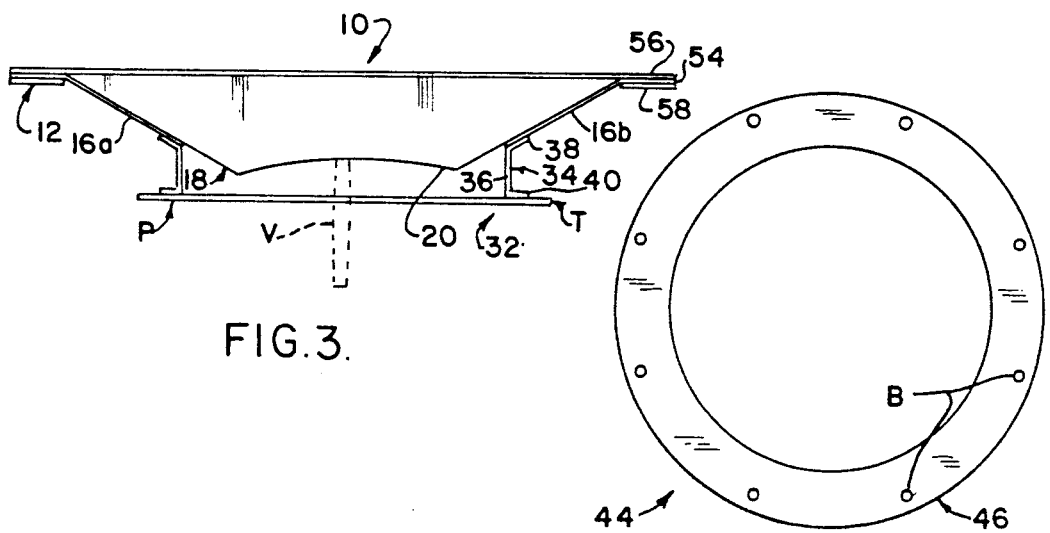
FIG.3.
FIG.4A.

5,314,094

CLOTH FLUIDIZING MEMBRANE FOR HOPPER CAR OUTLET

BACKGROUND OF THE INVENTION

This invention relates to a limp, porous membrane of a sheet or cloth material and, more particularly, to a cloth material used as a membrane for a fluidized outlet in a covered hopper railway car.

It is known to use a cloth material in an outlet assembly for a covered hopper railway car. See, for example, U.S. Pat. No. 4,846,377 which is assigned to the same assignee as the present invention. However, while cloth membranes are advantageous, their usefulness has heretofore been limited. For example, the cloth membrane structure disclosed in this earlier patent shows installation of the membrane between the bottom of an outlet pan (7 in the patent drawings) and an outlet manifold (19 in the drawings). Such an assembly works well for certain types of outlets. Where, however, an outlet valve such a butterfly valve is positioned in the outlet, the installation shown in the '377 patent is not feasible. Nonetheless, it is still important to use a cloth membrane installation with such outlets so the advantages enumerated in the '377 patent can still be realized.

SUMMARY OF THE INVENTION

Among the several objects of the present invention may be noted the provision of a cloth membrane for use in a covered hopper railway car outlet, and, in particular, outlets having outlet valves positioned in the flow path of material from the hopper into the outlet; the provision of such a membrane to be usable with a variety of pulverant, particulate ladings; the provision of such a membrane which is readily assembled with a boot of polypropylene or similar polymeric material that is lightweight, and readily installed; the provision of such a membrane which is readily installed to the upper portion of the outlet to simplify installation; the provision of such a membrane which is a unitary material that is stiffened to prevent "ballooning" of the membrane during off-loading of a lading; the provision of such a membrane having a contoured opening to accommodate for an outlet valve positioned in the outlet; the provision of such a membrane which is rugged in construction and reliable in operation; and, the provision of such a membrane which is easily cleaned.

In accordance with the invention, generally stated, a limp, porous membrane is made from a flexible sheet material. The membrane is used with a fluidized railway hopper car outlet containing a pulverant, particulate lading. The lading is fluidized and unloaded via the outlet which has a valve installed therein which, when open, allows the lading to be unloaded. The outlet has an outlet frame for securing the outlet to the hopper, an outlet opening in which the outlet valve is positioned, and intersecting outlet walls extending between the frame and the opening. An outer margin of the membrane is secured to the outlet frame. An inner margin of the membrane, which defines an opening for the lading to flow through the membrane, is attached to a boot. The boot is secured to the top of an outlet pan, adjacent the outlet opening, by a retaining ring which locks the boot in place with the opening in the membrane secured adjacent the outlet opening. This allows the lading to flow into the outlet through the valve. Other objects and features will be in part apparent and in part pointed out hereinafter.

BRIEF DESCRIPTION OF THE DRAWINGS

FIG. 1 is a top plan view of an outlet for a railway hopper car with a cloth membrane of the present invention installed;

FIGS. 2 and 3 are respective side and end elevational views of outlet;

FIG. 4A is a plan view of a gasket for the outlet.

Corresponding reference characters indicate corresponding parts throughout the drawings.

DESCRIPTION OF A PREFERRED EMBODIMENT

Figure 4B:
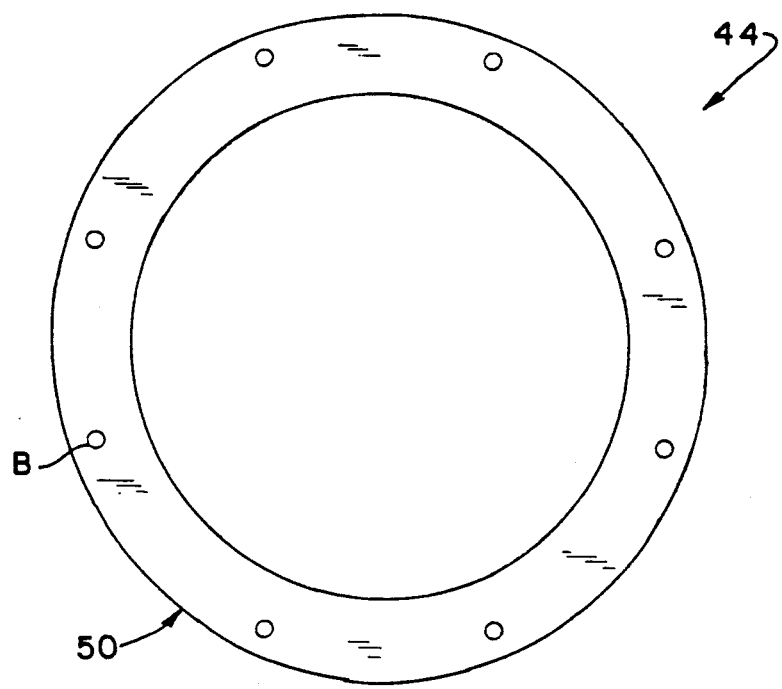
FIG. 4B is a plan view of a retaining ring for attaching a boot of the membrane assembly to the outlet.

Referring to the drawings, a fluidized outlet 10 communicates with a container (not shown) such as the covered hopper of a railway car (also not shown). The hopper carries pulverant, particulate ladings which are fluidized in a manner well-known in the art so they can be unloaded from the hopper via the outlet. The outlet is generally rectangular in plan and has an outlet frame 12 at its upper end for securing the outlet to the bottom of the hopper. The outlet also includes an outlet opening 14 in its lower end. An outlet valve such as a butterfly valve V is installed in this outlet (see FIGS. 2 and 3). The discharge of lading from the hopper is regulated by the degree to which this valve is opened. Four intersecting outlet walls 16a–16d extend between the frame and the opening.

A limp, porous membrane 18 of the present invention is made from a flexible sheet of material 20. Material 20 may be either a 1-ply or a 2-ply material. The thickness of the material is the same regardless of which ply material is used. Also, the material is a FDA approved material. The membrane is attachable to the outlet, as described hereinafter. During offloading, a fluidizing medium such as air flows through the membrane. The air fluidizes lading adjacent the outlet so that it readily flows into the outlet for discharge from the railcar. Referring to Fig. 1, membrane 18 may either be formed from a single, large piece of material; or, it may be made from four generally trapezoidal shaped pieces 22a–22d. If the former, the piece of material is generally rectangular, having sides 24a–24d whose lengths correspond to those of frame 12. The piece of material also has a large central opening 26 which is concentric with outlet opening 14, when the membrane is installed. Opening 26 is defined by an inner margin 28 of the material. If the membrane is formed of the four trapezoidally shaped pieces, opposed pieces 22a, 22b, and 22c, 22d are identical in shape. Pieces 22a, 22b extend along the longer sides of the outlet frame and pieces 2c, 22d the shorter sides. The four pieces are joined together along the slanted edges of the material by sewing the respective abutting edges 30 of the pieces together.

Unlike the membrane assembly described in coassigned U.S. Pat. No. 4,846,377 which is incorporated herein by reference, the outlets with which the membrane of the present invention are used include the butterfly valve referred to above in the outlet. As shown in FIGS. 2 and 3, the valve disk V of the butterfly valve extends nearly to the level of the outlet frame when the butterfly valve is fully opened. In outlet valves with which the membrane of '377 patent are used, a boot structure is used to install the central opening of the membrane between the bottom of the outlet and a manifold. In outlets with which the membrane of the present invention are used, the opening in the membrane is postioned at the top of the outlet pan. Accordingly, the membrane of the present invention includes boot means indicated generally 32 to which inner margin 28 of membrane 18, defining the opening 26 for lading to flow through the membrane, is attached.

Figure 5:
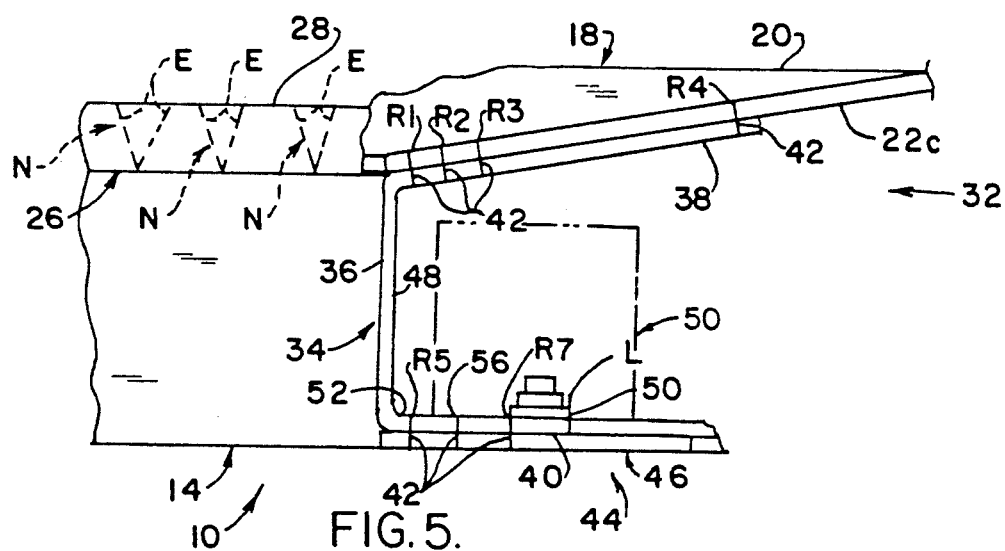
Fig. 5 is an elevational view, in section, of an inner margin of the membrane, and an installation boot, taken along line 5—5 in FIG. 1.

As best shown in FIG. 5, boot means 32 includes a boot 34 made of a polypropylene or similar lightweight plastic material. The boot comprises a hollow cylinder 36 the inner diameter of which corresponds to that of opening 26 so all the lading pouring through opening 26 readily flows into the outlet. The boot has an upper circumferential flange 38, and a lower circumferential flange 40. Both flanges extend radially outward from the side of the cylinder at its respective ends. The lower flange is orthogonal to the longitudinal axis of cylinder 36 so to rest flat upon a top surface T of outlet pan P.

The upper flange 38 extends outwardly from the cylinder at an angle to match the slope of membrane 18. This angle effectively produces a funnel to assist flow of lading into the outlet. The top flange of boot 34 is notched as indicated by dashed lines in FIG. 5. Portions of the material is cut away using scissors or other appropriate tools to produce notches N (three of which are shown in FIG. 5) around the perimeter of opening 26. This is done to allow expansion of the boot material to form flange 38 around the opening. After cutting, the edges E of each notch are stitched together to tighten the material at the openings.

Once flange 38 is completed, the inner margin of the membrane 18 adjacent the opening is fastened to flange 38 of boot 34. The material adjacent the opening is first pulled tight, and then the material is sewn to the flange using an appropriate thread 42. A plurality of rows of stitches is used to secure the membrane material to the boot. As shown in FIG. 5, four rows R1-R4 of stitches are made with thread 42. An inner row R1 is made at the inner end of the flange adjacent the mouth of cylinder 36. A second row R2 of stitches is made immediately outward of the first, and a third row R3 is made immediately outward of row R2. The thread 42 used to make these rows of stitches is, for example, a #60 nylon thread and the stitching is done so there are 4-6 stitches per inch. The rows are evenly spaced apart. Lastly, the fourth row of stitches R4 is made adjacent the outer end of flange 38. The result is that the membrane material, at the inner margin of the membrane, is pulled tightly over the upper flange of boot 34.

Next, the membrane assembly includes a means 44 for securing boot 34 to top surface T of the outlet pan. Means 44 first includes a gasket 46 such as shown in FIG. 4A. The gasket is annular is shape and made of an interwoven polyvinyl chloride (PVC) material. The gasket has circumferentially spaced holes corresponding to bolt holes openings B in the lower flange of the boot and in the pan surface for bolting the boot in place with bolts L. Referring again to FIG. 5, the gasket is attached to lower flange 40 of boot 36 by stitching them together with three rows R5-R7 of thread. The thread 42 is used to make these rows of stitching. The inner row of stitching R5 is made close to the outer sidewall 48 of the boot. Rows R6 and R7 are made outwardly from row R5 and are evenly spaced apart.

Referring to FIG. 4B, a retaining ring 50 of means 44 includes a stainless steel ring or the like. Ring 50 is also an annular ring and also includes bolt hole openings B similar to those in flange 40 and gasket 46. As shown in FIG. 5, ring 50 is fitted over the top surface 52 of flange 40. The boot assembly is then oriented over the opening in the outlet and bolts L are threaded into place to secure the membrane assembly to the top surface of the outlet pan.

Figure 6:
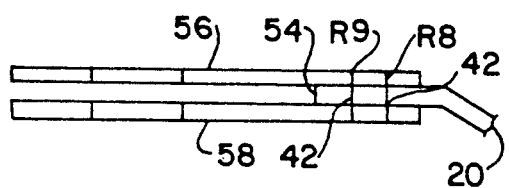
FIG. 6 is an elevational view, in section, of an outer margin of the membrane taken along line 6—6 in FIG. 1; and, FIG. 7 is a sectional view of the membrane taken along line 7—7 in FIG. 1 and showing reinforcement of the membrane.

Referring to FIG. 6, attachment of an outer margin 54 of the membrane to outlet frame 12 is shown. For this purpose, two gaskets 56, 58 respectively are also made of a PVC material. The gaskets comprise rectangular strips which conform in size and shape to the dimensions of the outlet frame. Each gasket includes openings for bolts used to secure the outlet frame to the hopper outlet (not shown). The outer margin of the membrane is sandwiched between the two gasket strips, the membrane material extending only partly the width of the respective strips. The membrane is secured between the strips using two rows R8 and R9 of stitching. The thread used for these rows is the same as previously described and the spacing of the stitches is also the same. The inner row R8 of stitches is made somewhat outwardly from the inner edge of the gaskets, and the outer row R9 of stitches is inwardly of the outer edge of membrane material. Although not shown, a stip of material could be installed between the gaskets outwardly of the outer end of the material, this to provide a uniform thickness to the assembly. Also not shown is a rubber gasket which may be installed over upper strip 56 when the outlet is attached to the hopper.

Figure 7:
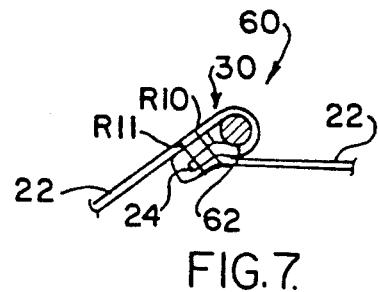

Because the outlet is a fluidized outlet, air is flowed through the membrane to facilitate lading discharge. As the hopper empties, the weight of material pressing against the membrane diminishes. At some point, the air pressure acting on the underside of the membrane may exceed the pressure of the lading bearing down on it. When the occurs, the membrane material tends to be pushed upwardly, or "balloon". To prevent this, a stiffener means 60 is used to stiffen the membrane material. Referring to FIG. 7, stiffener means 60 includes a plurality of reinforcement rods 62 which are attached to the membrane. For the membrane assembly, four (4) such rods are used. Referring to FIG. 1, each rod extends diagonally from the one corner of the outlet frame toward the center of the membrane. Each is, for example a ⅜" (0.95 cm.) diameter rod which is installed on the back side of the membrane. Attachment of the rods depends upon wheter the membrane is unitary or assembled from panels. If unitary, a diagonal fold is made in the material. fold back over on itself, a pocket is formed in which a rod 62 is inserted. The outer end of the fold is then stitched to the membrane web to close the pocket with the rod enclosed in it. If the membrane is made from panels 22, the edge 24 of one panel is folded into a pocket in which a rod 62 is enclosed. The adjacent edge 24 of the mating panel 22 is then inserted between the outer end of the fold and the web of membrane material. This adjacent edge is then folded back over on itself so, as seen in FIG. 7, the result looks like a pair of interlocking U-shaped panel segments. The segments are then stitched together along the length of the folds. Two rows of parallel stitches R10 and R11 are used. Both rows of stitches go through all four layers of membrane material to effect a tight encapsulation of the reinforcement rod. Again, the same thread material and same stitch pattern as previously described is used.

What has been described is a cloth membrane for use in covered hopper railway car outlets the provision of such a membrane to be usable with a variety of pulverant, particulate ladings. The membrane is particularly useful in outlets having outlet valves positioned in the flow path of material from the hopper into the outlet. For this purpose, the membrane has a contoured opening to accommodate an outlet valve positioned in the outlet. The provision membrane readily assembled with a boot of polypropylene or similar polymeric material to make a lightweight, readily installed assembly. In the types of outlets with which the membrane is useful, the membrane is installed to the upper portion of the outlet. The membrane is of a unitary material which is stiffened to prevent "ballooning" of the membrane during off-loading of a lading. Finally, the membrane ruggedly constructed for reliable operation, and is easily cleaned.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A limp, porous membrane of flexible sheet material for use with a fluidized outlet which is in communication with a container such as a hopper containing a pulverant, particulate lading which is fluidized and unloaded via said outlet, said outlet having a valve installed therein which, when open, allows fluidized lading to be unloaded through said outlet, said outlet having an outlet frame for securing said outlet to said hopper, an outlet opening in which said outlet valve is positioned, intersecting outlet walls extending between said frame and said opening, said membrane having an outer margin secured to said outlet frame;

boot means to which an inner margin of the membrane, defining an opening for the lading to flow through the membrane, is attached, said boot means being positioned at the top of an outlet pan; and, means for securing said boot means to said outlet pan adjacent said outlet opening and including a ring means for locking said boot means in place whereby said opening in said membrane is secured adjacent said outlet opening for the lading to flow into said outlet through said valve.

2. The membrane of claim 1 wherein said inner margin of said membrane defines a concave opening which fits about said outlet valve.

3. The membrane of claim 1 which is formed from a single piece of material.

4. The membrane of claim 1 which is formed from a plurality of generally trapezoidal panels which are joined together.

5. The membrane of claim 1 further including stiffener means carried by said membrane and extending from said outer margin to said inner margin of said membrane for reinforcing the membrane when the outlet is fluidized to keep the membrane from "ballooning".

6. The membrane of claim 1 wherein said boot means includes a boot comprising a hollow cylinder with a flange extending radially outward at each end of the cylinder, the flange at one end of said cylinder extending outwardly at an angle with respect to an orthogonal axis of the cylinder, for the inner margin said membrane to be drawn over said flange.

7. The membrane of claim 6 wherein the inner margin of said membrane is notched at intervals about the circumference of the margin with the sides of the notches being drawn together by a fastening means.

8. The membrane of claim 7 wherein said fastening means further includes means for fastening said membrane to said flange at said one of said cylinder.

9. The membrane of claim 7 further including a gasket positioned between the cylinder and said outlet, the flange at the other end of said cylinder bearing against said gasket.

10. The membrane of claim 9 wherein said fastening means further includes means for fastening said flange at said other end of said cylinder to said gasket.

11. The membrane of claim 1? further including a second gasket positioned between said outer margin of said membrane and said container.

12. The membrane of claim 11 wherein said fastening means further includes means for fastening said outer end of said membrane to said second gasket.

13. The membrane of claim 12 further including a third gasket, the outer margin of said membrane being sandwiched between said second and third gaskets with the fastening means said outer margin between said second and third gaskets.

14. The membrane of claim 12 wherein said fastening means comprises lengths thread for sewing the various portions of the membrane together or to said gaskets.

15. The membrane of claim 1 wherein said boot means includes a boot comprising a hollow cylinder having flanges extending radially outward at each end of the cylinder, and the membrane further includes a gasket positioned between the cylinder and said outlet, the flange at one end of said cylinder bearing against said gasket, the ring means including a retainer ring fitting over said flange and secured to said outlet to lock said boot in place.

* * * * *